United States Patent
Ries et al.

(10) Patent No.: US 11,392,482 B2
(45) Date of Patent: Jul. 19, 2022

(54) DATA BREAKPOINTS ON CERTAIN KINDS OF FUNCTIONS

(71) Applicant: Microsoft Technology Licensing, LLC, Redmond, WA (US)

(72) Inventors: Charles Joseph Ries, Seattle, WA (US); Patrick Nelson, Redmond, WA (US); Cagri Aslan, Newcastle, WA (US); Gregory Miskelly, Seattle, WA (US); Isadora Sophia Garcia Rodopoulos, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 16/239,474

(22) Filed: Jan. 3, 2019

(65) Prior Publication Data

US 2020/0218639 A1    Jul. 9, 2020

(51) Int. Cl.
*G06F 11/36* (2006.01)
*G06F 11/34* (2006.01)

(52) U.S. Cl.
CPC ...... *G06F 11/3636* (2013.01); *G06F 11/3466* (2013.01); *G06F 11/3648* (2013.01)

(58) Field of Classification Search
CPC .................................................. G06F 11/3636
USPC ........................................................ 717/127
See application file for complete search history.

(56) References Cited

U.S. PATENT DOCUMENTS

| | | | | |
|---|---|---|---|---|
| 6,634,020 | B1 * | 10/2003 | Bates | G06F 11/362 |
| | | | | 712/227 |
| 6,981,248 | B2 * | 12/2005 | Bates | G06F 11/3664 |
| | | | | 714/34 |
| 7,058,928 | B2 * | 6/2006 | Wygodny | G06F 11/3636 |
| | | | | 714/E11.212 |

(Continued)

OTHER PUBLICATIONS

Bartlomiej Filipek;"Understand Conditional Breakpoints in C++"; Visual Studio Magazine website [full url in ref.]; Sep. 14, 2016 (Year: 2016).*

(Continued)

*Primary Examiner* — Wei Y Zhen
*Assistant Examiner* — Clint Thatcher
(74) *Attorney, Agent, or Firm* — Ogilvie Law Firm

(57) ABSTRACT

To set data breakpoints on properties and certain other functions, constituent data locations (CDLs) that can contribute to computation of the property value or other function result are identified, and respective constituent data breakpoints are added at one or more CDLs by data breakpoint adder code. Each constituent data breakpoint will suspend execution of an inspectable software in response to occurrence of a CDL data entry. The CDLs are identified by CDL identifier code using static data flow analysis, enhanced interpretation, or disassembly, with recursion as appropriate. Kernel or runtime routines, and other routines designated as known, can be excluded from the CDL search. Data locations marked read-only, or that are effectively read-only because they will not be written, can also be excluded. The resulting data breakpoint functionality makes internal program state information available, thus facilitating computing system accuracy, flexibility, security, speed, memory usage efficiency, and other functional characteristics.

20 Claims, 4 Drawing Sheets

(56) References Cited

U.S. PATENT DOCUMENTS

| | | | |
|---|---|---|---|
| 7,178,135 B2* | 2/2007 | Bates | G06F 11/362 714/38.13 |
| 7,299,456 B2* | 11/2007 | Bates | G06F 11/3648 714/E11.207 |
| 7,783,865 B2* | 8/2010 | Burdick | G06F 11/3636 712/227 |
| 7,992,133 B1* | 8/2011 | Theroux | G06F 11/3664 709/201 |
| 8,091,075 B2* | 1/2012 | Bates | G06F 11/3664 714/25 |
| 8,239,838 B2* | 8/2012 | Yim | G06F 11/3656 717/124 |
| 8,752,023 B2* | 6/2014 | Golan | G06F 11/362 717/124 |
| 2006/0041867 A1* | 2/2006 | Bates | G06F 11/3624 717/129 |
| 2008/0256394 A1 | 10/2008 | Rashevsky et al. | |
| 2009/0183154 A1 | 7/2009 | Miskelly et al. | |
| 2009/0307528 A1 | 12/2009 | Byers et al. | |
| 2009/0307663 A1 | 12/2009 | Maybee et al. | |
| 2009/0328005 A1 | 12/2009 | Miskelly | |
| 2010/0161910 A1 | 6/2010 | Stall et al. | |
| 2010/0192134 A1 | 7/2010 | Arkhipov et al. | |
| 2012/0084753 A1 | 4/2012 | Maybee et al. | |
| 2012/0246624 A1 | 9/2012 | Halliday et al. | |
| 2012/0266144 A1 | 10/2012 | Halliday et al. | |
| 2012/0304156 A1 | 11/2012 | Feiveson et al. | |
| 2012/0324479 A1 | 12/2012 | Miskelly | |
| 2012/0331351 A1 | 12/2012 | Davis et al. | |
| 2014/0053142 A1 | 2/2014 | Fanning et al. | |
| 2014/0068544 A1 | 3/2014 | Fanning et al. | |
| 2014/0282417 A1 | 9/2014 | Paveza et al. | |
| 2014/0282427 A1 | 9/2014 | Fanning et al. | |
| 2015/0199259 A1 | 7/2015 | Paveza et al. | |
| 2015/0199261 A1 | 7/2015 | Paveza et al. | |
| 2015/0347269 A1 | 12/2015 | Nelson et al. | |
| 2015/0347274 A1 | 12/2015 | Taylor et al. | |
| 2017/0116108 A1 | 4/2017 | Miskelly et al. | |

OTHER PUBLICATIONS

Revin Guillen; "Better Debugging with Conditional Breakpoints"; David Walsh Blog website [full url in ref.]; Oct. 9, 2017 (Year: 2017).*

"Eclipse (software)", retrieved from <<https://en.wikipedia.org/wiki/Eclipse_(software)>>, Jun. 18, 2018, 10 pages.

"Breakpoint on property change", retrieved from <<https://stackoverflow.com/questions/11618278/breakpoint-on-property-change>>, Jul. 23, 2012, 10 pages.

"JetBrains", retrieved from <<https://en.wikipedia.org/wiki/JetBrains>>, Jun. 21, 2018, 4 pages.

John K. Paul, "Break on Property Change of an Arbitrary Object", retrieved from <<http://johnkpaul.com/blog/2013/07/20/break-on-property-change/>>, Jul. 20, 2013, 4 pages.

"Extensions for the Visual Studio family of products", retrieved from <<https://marketplace.visualstudio.com/>>, No. later than Jul. 7, 208, 2 pages.

Daniel Moth, "Set breakpoints on auto-implemented properties with Visual Studio 2015", retrieved from <<https://blogs.msdn.microsoft.com/devops/2014/11/14/set-breakpoints-on-auto-implemented-properties-with-visual-studio-2015/>>, Nov. 14, 2014, 10 pages.

"Debugger flow control: Hardware breakpoints vs software breakpoints", retrieved from <<http://www.nynaeve.net/?p=80>>, Nov. 7, 2006, 3 pages.

"LINQ Debugging", retrieved from <<https://www.oz-code.com/main#/features>>, no later than Dec. 12, 2018, 14 pages.

"Property (programming)", retrieved from <<https://en.wikipedia.org/wiki/Property_(programming)>>, Dec. 11, 2018, 11 pages.

"Visual Studio Code", retrieved from <<https://en.wikipedia.org/wiki/Visual_Studio_Code>>, Jul. 7, 2018, 8 pages.

"Visual Studio Extensibility", retrieved from <<https://en.wikipedia.org/wiki/Visual_Studio_Extensibility>>, May 27, 2018, 3 pages.

"Extensions for the Visual Studio family of products", retrieved from <<https://marketplace.visualstudio.com/vscode>>, no later than Jul. 7, 2018, 2 pages.

Jana, Abhijit, "Debugging Lambda Expression in Visual Studio 2015—Watch Windows, Immediate Windows and also in DataTips", Retrieved from : https://dailydotnettips.com/debugging-lambda-expression-in-visual-studio-2015-watch-windows-immediate-windows-and-also-in-data-tips/, Jul. 27, 2015, pp. 1-11.

"International Search Report and Written Opinion Issued in PCT Application No. PCT/US19/068457", dated Mar. 27, 2020, 13 Pages.

Sharma, et al., "Intelligent debugging and In-Memory Fuzzers", Retrieved from: Intelligent debugging and In-Memory Fuzzers, Sep. 30, 2010, 27 Pages.

Wahbe, Robert, "Efficient Data Breakpoints", Published in ACM SIGPLAN Notices, vol. 27, Issue 9, Sep. 1, 1992, pp. 200-212.

Wahbe, et al., "Practical Data Breakpoints: Design and Implementation", Published in ACM SIGPLAN Notices, vol. 28, Issue 6, Jun. 1, 1993, pp. 1-12.

* cited by examiner

DATA BREAKPOINTS ON CERTAIN KINDS OF FUNCTIONS

BACKGROUND

Noon Computer software is often complex. Complexity introduces the all-too-often realized possibility of programming errors, a.k.a. "bugs". The process of identifying the cause of a bug and attempting to modify a program to remediate or remove the bug's unwanted impact is referred to as "debugging". Some of the software tools which assist debugging are called "debuggers". The program being debugged is called the "debuggee". A debugger generally provides a software developer with some control over debuggee execution, such as pausing execution to examine the debuggee's variables and other internal state information, stepping through debuggee code line-by-line, and setting a breakpoint to stop debuggee execution when the execution reaches a specified location within the debuggee. Some debuggers allow a developer to modify the debuggee's internal state during debugging by setting variables, instead of merely observing the internal state.

SUMMARY

As taught herein, some debugging tools and processes are tailored to improve computing system breakpoint functionality. Improvements in breakpoint functionality in turn help improve the computing system's accuracy, flexibility, security, speed, memory usage efficiency, and other functional characteristics, by making internal program state information available to increase understanding of how a current version of software under development or testing actually operates.

Some embodiments for data breakpoint usage which are presented herein include a processor, a digital memory in operable communication with the processor, an inspectable software, a constituent data locations (CDLs) identifier code, and a data breakpoint adder. The inspectable software includes instructions which are executable with the processor, and includes data locations. In particular, the inspectable software includes a function which upon execution with the processor computes a function result which is dependent upon one or more data values stored in respective CDLs of the function. Upon execution, the CDL identifier code identifies one or more CDLs of the function. The data breakpoint adder upon execution adds a constituent data breakpoint which is configured to suspend execution of the inspectable software in response to entry of a data value at a CDL of the function. The CDL identifier code and data breakpoint adder contribute to data breakpoint functionality. The constituent data breakpoint is configured to suspend execution of the inspectable software in response to occurrence of a CDL data entry, as opposed to suspending execution in response to execution reaching a specified instruction of the inspectable software.

Some embodiments or embodiment environments presented herein provide or utilize actions that set one or more data breakpoints in a computing system. These actions include receiving a command to set a data breakpoint on a specified function with specified input parameters in an inspectable software. The specified function has instructions which upon execution compute a function result that is dependent upon data stored in one or more constituent data locations (CDLs) of the function. The actions also include automatically identifying at least two CDLs of the function, and adding to the computing system corresponding constituent data breakpoints, each of which is configured to suspend execution of the inspectable software in response to entry of a data value at a CDL of the function. The actions contribute a data breakpoint functionality which is configured to suspend execution of the inspectable software in response to occurrence of a CDL data entry, as opposed to suspending execution in response to execution reaching a specified instruction of the inspectable software. In some cases, the function is a property of an object instance, and the function result is a computed property value.

Other technical mechanisms, structures, and activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
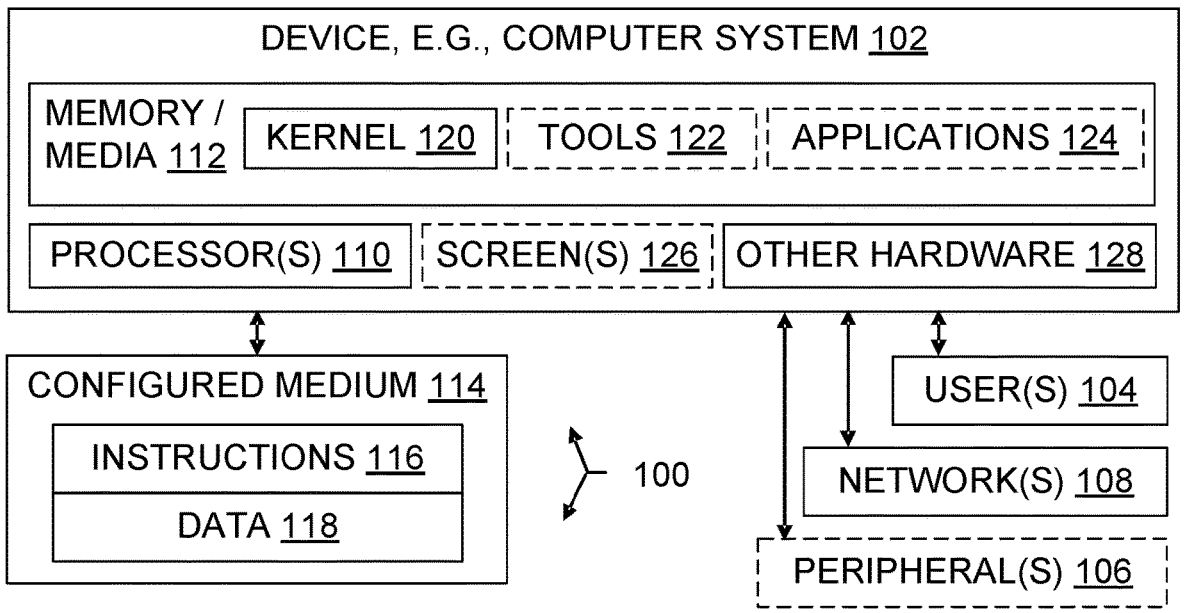
FIG. 1 is a block diagram illustrating a computer system generally and also illustrating a configured storage medium generally.

Many innovations expand beyond their origins, but understanding an innovation's origins can help one more fully appreciate the innovation. In the present case, some teachings presented herein were motivated by a technical challenge of setting a breakpoint on a property in an object-oriented programming language environment, such that the breakpoint would be triggered by a change in the property value instead of being triggered by the instruction pointer reaching a particular instruction. That is, the goal was a property data breakpoint, as opposed to a property code location breakpoint. Other technical challenges addressed by the innovations taught here will also be apparent to one of skill from the discussion provided below.

One of skill in the art will acknowledge that many debuggers support breakpoints on variables, also known as "data breakpoints" or as "watch points", in order to support breaking when a variable inside a program is changed. However in some programming languages or runtimes, including some Microsoft .NET™ environments and other environments, objects are sometimes visualized by evaluating their properties rather than by looking at a raw view of their fields. In this context, properties can be considered special methods that act like fields to a consumer of the object, but are actually implemented with a special 'get' method which takes no arguments (other than a 'this' parameter in non-static properties) and returns a value.

Because examining properties is how programmers sometimes try to understand the objects they are consuming, it is useful to be able to set data breakpoints on properties, using teachings provided herein. This capability can free programmers from expending time and resources to understand how a property is implemented in order to manually set one or more breakpoints inside the property's implementation. Teachings herein also help make data breakpoints on properties more accurate when virtual calls, or conditional code such as if-then statements or loops, are part of a property's implementation.

Teachings provided herein describe various tools and techniques for setting data breakpoints on properties, and for setting data breakpoints on certain other functions of which properties are a special case.

One approach to setting a data breakpoint on a property interprets the property's implementation using an enhanced interpreter which identifies constituent data locations (CDLs) as the interpretation proceeds. The interpreter used in setting data breakpoints is not necessarily the same interpreter being used generally to execute an interpreted program. A data breakpoint interpreter may be present and used regardless of whether normal execution of the program proceeds through interpretation or through execution of binary code or through some combination thereof. CDLs are the data locations whose values may contribute (or in some embodiments, whose values do contribute) to the computation of the property's value.

Another approach to setting a data breakpoint on a property disassembles a 'get' method of the property, either to its native instructions, or in some cases to an intermediate language if one is available. Then the data breakpoint setting code performs a data flow analysis on the 'get' method to find the set of fields, statics, globals, or other data locations (CDLs) that are read to compute the property value. This data breakpoint setting code may recurse on any other methods called by the 'get' method. Finally, this data breakpoint setting code adds one or more data breakpoints on the discovered CDLs.

Under either approach, setting breakpoints on CDLs may be done at least in part by using hardware data breakpoint support in the processor to stop debuggee execution when the constituent data locations receive a value, or by setting conditional breakpoints on the instructions where these CDLs are set. The latter technique can be done in software and so is useful if the underlying runtime or processor doesn't support data breakpoints via special-purpose hardware, or if the underlying runtime or processor's data breakpoint hardware support is not sufficient to set all of the constituent breakpoints for the property in question. For example, x86 and x64 processors only provide hardware support for at most four data breakpoints. So if a property reads from five CDL variables, then the available hardware support alone will be insufficient.

Although setting data breakpoints on properties was a motivating example, and property breakpoints are discussed herein as examples, the techniques described herein can also be used on other functions which are not properties.

Some embodiments described herein may be viewed by some people in a broader context. For instance, concepts such as computation, data storage, identification, location, and suspension of activity, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to suspend program execution with a variable changes and that variable change will change the value of an object property. Other configured storage media, systems, and methods involving computation, data storage, identification, location, or suspension of activity are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular programming languages, tools, contexts, identifiers, fields, properties, files, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by making the internal operational state of those systems more accessible, thus facilitating debugging, performance tuning, security monitoring, and other computational activities. Specifically, some embodiments provide data breakpoint functionality that was not previously available. Other advantages based on the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface, a.k.a. application programming interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
ID: identifier
IP: internet protocol LAN: local area network
OS: operating system
RAM: random access memory
ROM: read only memory
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" by itself and "software" are used interchangeably herein. Executable code, interpreted code, and firmware are some examples of code. Code which must be interpreted or compiled in order to execute is referred to as "source code".

"Constituent data location" is terminology coined for use in the present disclosure. A "data location" is a digital storage location, e.g., a processor register, cache, RAM location, ROM location, location on a hard drive or in a flash memory or other memory, or another location which holds at least one data value in a volatile or non-volatile digital storage device. A given data location is a constituent data location (CDL) relative to an expressly or implicitly specified property value or other function result when the data value(s) stored in the given data location can be used in computing the property value or other function result, in at least one execution path of the code which computes the property value or other function result. That is, the CDL is functionally a constituent of the property value or other function result. If the CDL value changes, then the property value or other function result may change as a result of the CDL value change (as an optimization, a user may then be notified only if the evaluated function result actually changes). In some programming languages or environments, CDLs may move in memory, e.g., as a result of garbage collection. In such cases, a debugger or other enhanced tool may receive notifications of CDL movement and adjust 926 breakpoints accordingly.

In some embodiments, only data locations which actually contribute to the computed property value or other function result (i.e., are on the execution path taken) are considered constituents. But unless that further limitation is clearly present, any data location which might contribute—depending on how conditional code is executed or how virtual calls are resolved, for example—serves as a CDL. Data locations that are not accessible during any possible execution path in the property value or other function result are not CDLs. The data locations that serve as CDLs are not arbitrary memory locations, but are instead constituents in the sense that they can impact the computation of a function result. Some examples of possible CDLs include object fields, static variables, and global variables, among others.

"Entry" of a value into or at a digital storage location is accomplished by writing a new value to the storage location, writing the same value to the storage location, incrementing or decrementing a value in the storage location, clearing or zeroing the storage location, or otherwise accessing the storage location in any way which is not limited to a read-only access with no side-effects. Entry of a value is also referred to as "entering" the value.

A "constituent data breakpoint" is a data breakpoint at or on a constituent data location.

"Program" is used broadly herein, to include applications, kernels, drivers, interrupt handlers, firmware, state machines, libraries, services, cloud infrastructure components, middleware, and other code written by programmers (who are also referred to as developers) and/or automatically generated.

"Routine" means a function, method, procedure, or other piece of code which can receive control non-sequentially by being called and then return, e.g., via an address pushed on a call stack. Other than parameterless void routines which neither accept parameters nor return a value, routines also use a stack to receive value(s), to return value(s), or both.

A "function" is a routine which returns a value at the point it was called.

A "DBPA function" is a data-breakpoint-amenable function, which is a function amendable to having a data breakpoint set on it. Some examples of DBPA functions include properties, functions which have no input parameters, and other functions identified herein as functions on which a data breakpoint (as opposed to a code location breakpoint) can be set. Some examples of functions which are not data-breakpoint-amenable include functions whose CDLs (if any) cannot be identified, e.g., because they include calls into kernel routines that the CDL identifier code is unable to analyze.

A "property" is a construct used in some object-oriented programming languages. It may be implemented as a particular kind of class member which has functionality that is between a field or data member, on the one hand, and a method, on the other. From a developer's perspective, a syntax for reading and writing properties resembles the syntax for reading and writing fields. However, property reads and writes are often translated to 'get' and 'set' method calls (a.k.a., 'getter' and 'setter' calls). Properties with a 'get' method are a proper subset of properties in general, and properties (even in general) are a proper subset of the functions on which data breakpoints are set using teachings herein, which are in turn a proper subset of functions generally, which are a proper subset of routines.

"Service" means a consumable program offering in a cloud computing environment or other network or computing system environment.

"Cloud" means pooled resources for computing, storage, and networking which are elastically available for measured on-demand service. A cloud may be private (e.g., on-premises), public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as setting a breakpoint, making a storage location entry (i.e., entering a value at or in a storage location), interpreting code with an interpreter, employing hardware breakpoint support, calling a routine, recursing, resolving a virtual call, performing instructions of a program or other software, executing software, and suspending execution of software, are each understood herein as inherently digital. A human mind cannot interface directly with a CPU or network interface card or other processor, or with RAM or other digital storage, to read and write the necessary data and perform the necessary operations on digital values to perform the data breakpoint setting steps taught herein. This would be well understood by persons of skill in the art in view of the present disclosure, but others may sometimes need to be informed or reminded of the facts. Unless stated otherwise, embodiments are also presumed to be capable of operating at scale in production environments, or in testing labs for production environments, as opposed to being mere thought experiments. For present purposes, "operating at scale" means setting a data breakpoint in software whose source code includes at least five hundred lines (exclusive of standard libraries or kernel code), whose binary executable is at least five megabytes in size (exclusive of kernel code), or both.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, calling, computing, constituting, contributing, debugging, disassembling, eliminating, employing, entering, excluding, executing, identifying, inspecting, interpreting, obtaining, performing, receiving, recursing, setting, storing, suspending, or utilizing (and adds, added, calls, called, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; may be further characterized in some situations as a development environment or a production environment, for example 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable storage media or in other memory (volatile or non-volatile or both)

118 data, e.g., data value(s) stored in a data location 120 kernel(s), e.g., operating system(s), BIOS, device drivers 122 tools, e.g., anti-virus software, firewalls, packet sniffer software, intrusion detection systems (IDS), intrusion prevention systems (IPS), software development tools and tool suites, hardware development tools and tool suites 124 applications, e.g., word processors, web browsers, spreadsheets, games, email tools, web apps 126 display screens, also referred to as "displays"

Figure 6:
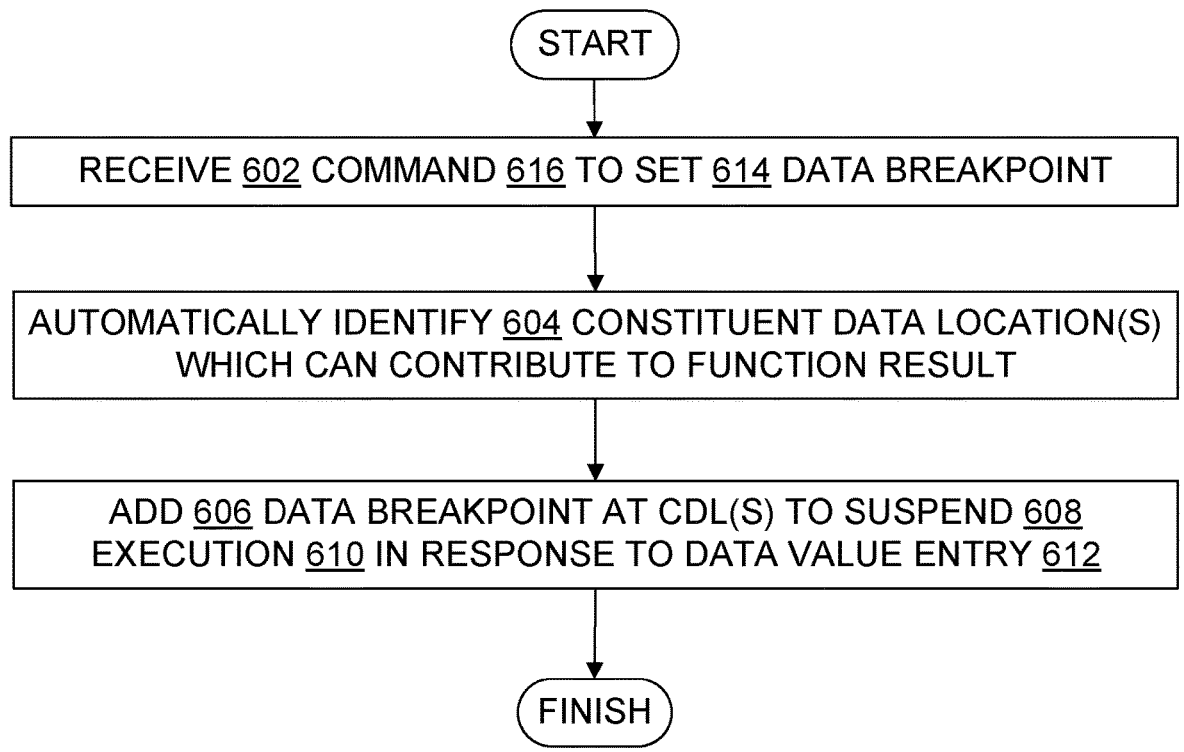
FIG. 6 is a flowchart illustrating some data breakpoint setting processes for certain functions.
Figure 7:
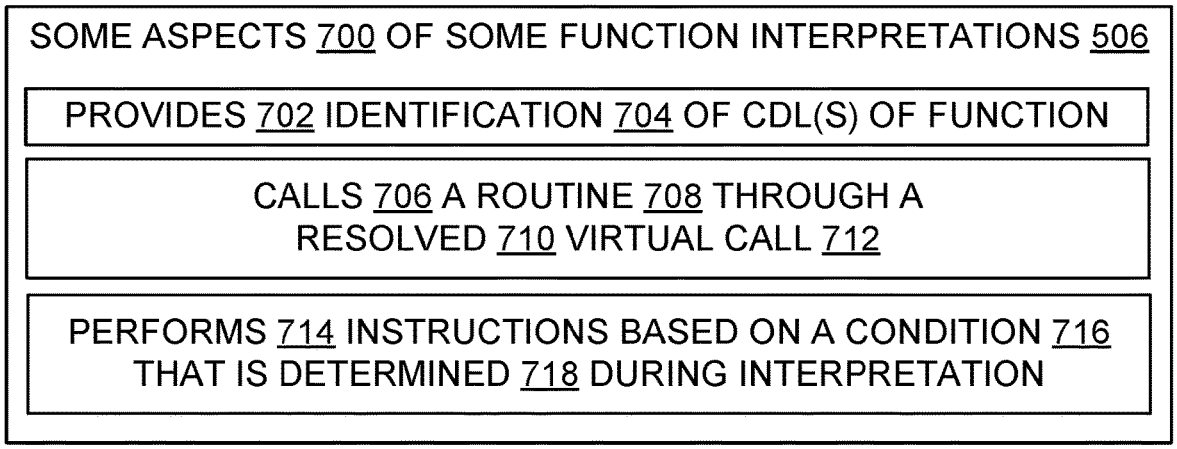
FIG. 7 is a block diagram illustrating some aspects of code interpretation that are relevant to identifying constituent data locations.
Figure 8:
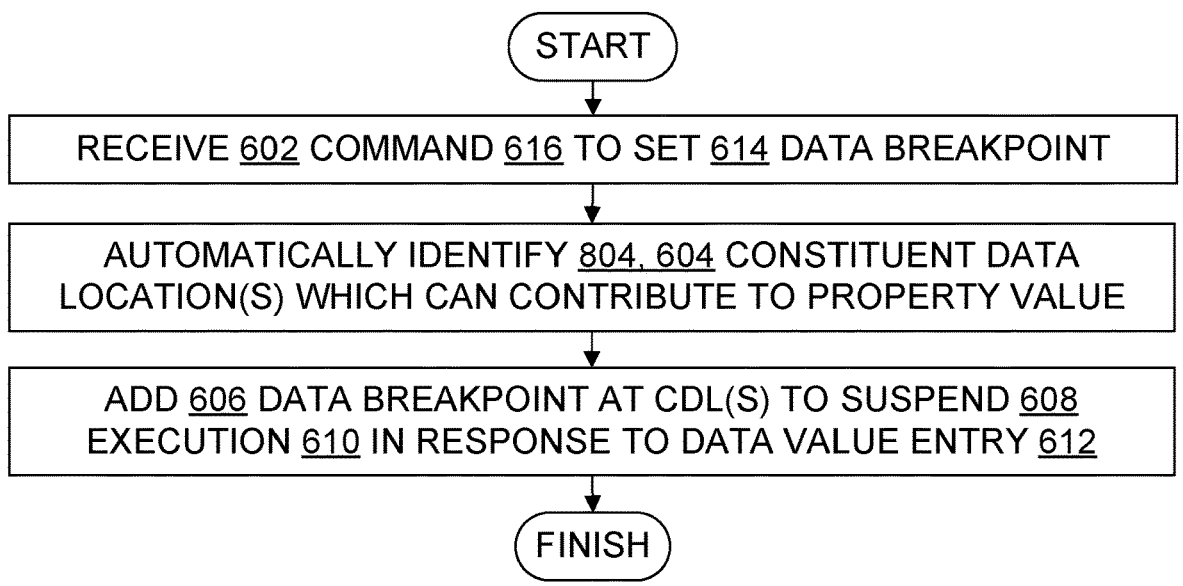
FIG. 8 is a flowchart illustrating some data breakpoint setting processes for properties.
Figure 9:
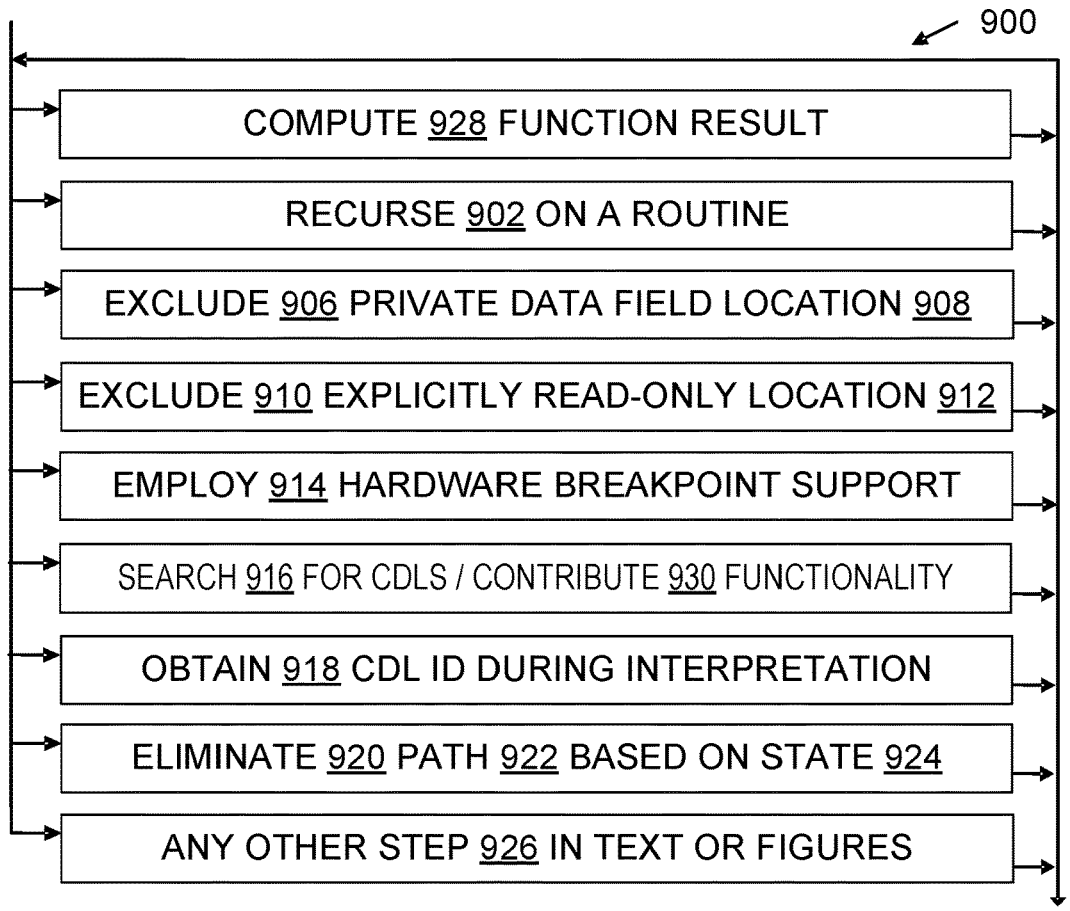
FIG. 9 is a flowchart further illustrating steps in some data breakpoint setting processes.

128 computing hardware not otherwise associated with a reference number 106, 108, 110, 112, 114
200 system enhanced by data breakpoint functionality
202 CDL identifier code generally
204 CDL identifier code which identifies CDLs at least in part by interpretation; in other words, CDL identifier code 204 is an interpreter which identifies one or more CDLs during interpretation of a function; 204 also refers to utilization of interpretation by CDL identifier code
206 function result, e.g., property value or other value returned by a function
208 data breakpoint, as opposed to code location breakpoint (data breakpoints trigger on data entry, whereas code location breakpoints trigger on instruction pointer value or other location in a sequence of software instructions)
210 data breakpoint adder
212 inspectable software, e.g., an application 124 or other software which is subject to inspection in a debugger
214 data-breakpoint-amenable function, a.k.a. DBPA function
216 data location generally; also referred to as "data storage location"
218 constituent data location (CDL) of a given DBPA function
220 known routine, e.g., routine in a standard library, kernel, or other set of routines which are identified in a given embodiment as known routines whose data locations will not be identified as CDLs
222 routine identifier, e.g., name, GUID, address, or another item which distinguishes routines from one another
224 hardware support for breakpoints, e.g., processor breakpoint registers together with comparator circuitry which suspends execution when any instruction it sees attempts to read, write, or execute (depending on the configuration) an address or other value that is specified in one of the breakpoint registers
226 breakpoints generally, e.g., data breakpoints and code location breakpoints
228 property value
230 standard libraries
232 runtime
234 functionality
302 function which has no input parameters
304 parameter
306 function which is a property implemented in an object-oriented programming language; also referred to simply as a "property"
310 object-oriented programming language
312 function which has as its only input an object instance
314 object instance, or identifier thereof suitable for passing as a parameter
316 'get' method of property; also referred to without single quotes
318 'set' method of property; also referred to without single quotes
402 field in an object or a class that defines objects
404 object (generally or an instance)
406 static variable
408 global variable
500 aspects of CDL identifier code
502 utilization of static data flow analysis; also refers to code which utilizes static data flow analysis
504 static data flow analysis
506 interpretation of code, as opposed to execution of binary code
508 utilization of disassembly of code; also refers to code which disassembles other code
510 act of disassembling code; also refers to result of disassembling code
512 avoidance of identifying as CDLs data locations of known routines; also refers to code which avoids identifying as CDLs data locations of known routines
600 data breakpoint setting processes (a.k.a. methods) which include steps shown in FIG. 6; also refers to the FIG. 6 flowchart illustrating these processes
602 receive a command to set a data breakpoint, e.g., from a user through a debugger interface
604 identify CDLs of a function
606 add data breakpoint at one or more CDLs
608 suspend execution
610 execute software; also refers to a given execution of a piece of software
612 entry of a data value in or at a storage location; also referred to as "entering" the data value
614 set a data breakpoint on a property or a DBPA function
616 command to set a data breakpoint on a property or a DBPA function
700 aspects of function interpretation
702 interpretation (or interpreter) provides identification of CDL(s) for use in setting data breakpoint
704 identification of CDL(s) for use in setting data breakpoint, e.g., address, location in symbol table, GUID, namespace and name, or other storage location identification
706 call to a routine; also refers to action of calling a routine
708 routine, generally
710 resolved virtual call; also refers to resolving a virtual call
712 virtual call, e.g., call to a routine whose specific identity is determined at runtime
714 performing instructions based on a condition, e.g., executing one branch of an if statement or one branch of a switch statement
716 condition which impacts at runtime which group of instructions will be executed or how many times a group of instructions will be executed, e.g., a loop condition or an if statement condition or a switch statement condition
718 determination of the runtime value of a condition 716
800 data breakpoint setting processes (a.k.a. methods) which include steps shown in FIG. 8; also refers to the FIG. 8 flowchart illustrating these processes
804 identify CDLs of a property
900 data breakpoint setting processes (a.k.a. methods) which include steps shown or referenced in FIG. 9; also refers to the FIG. 9 flowchart illustrating these processes
902 recurse, i.e., proceed recursively
906 exclude private data field as a CDL
908 private data field (a kind of storage location)
910 exclude a explicitly read-only storage location as a CDL
912 explicitly read-only storage location, e.g., one marked in source code as "read-only"
914 employ hardware breakpoint support, e.g., by configuring a processor breakpoint register with a storage location's address
916 search for CDLs
918 obtain a CDL identifier during interpretation
920 eliminate an execution path from a search for CDLs
922 execution path
924 program state information, e.g., storage location contents together with instruction pointer(s) (each thread may have its own instruction pointer)

926 any step discussed in the present disclosure that has not been assigned some other reference numeral 928 compute a function result 930 contribute a data breakpoint functionality to a system or process Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

Software developers, quality assurance testers, and users performing demonstrations of enhanced debuggers are each a particular type of user 104, although it is contemplated that most users will likely be software developers. Automated agents, scripts, playback software, and the like acting on behalf of one or more people may also be users 104, e.g., to facilitate testing a system 102, but users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific configurations, implementations, arrangements, displays, features, groupings, approaches, or scenarios provided herein. A given embodiment may include additional or different technical features, mechanisms, sequences, components, or data structures, for instance, and may otherwise depart from the examples provided herein.

Figure 2:
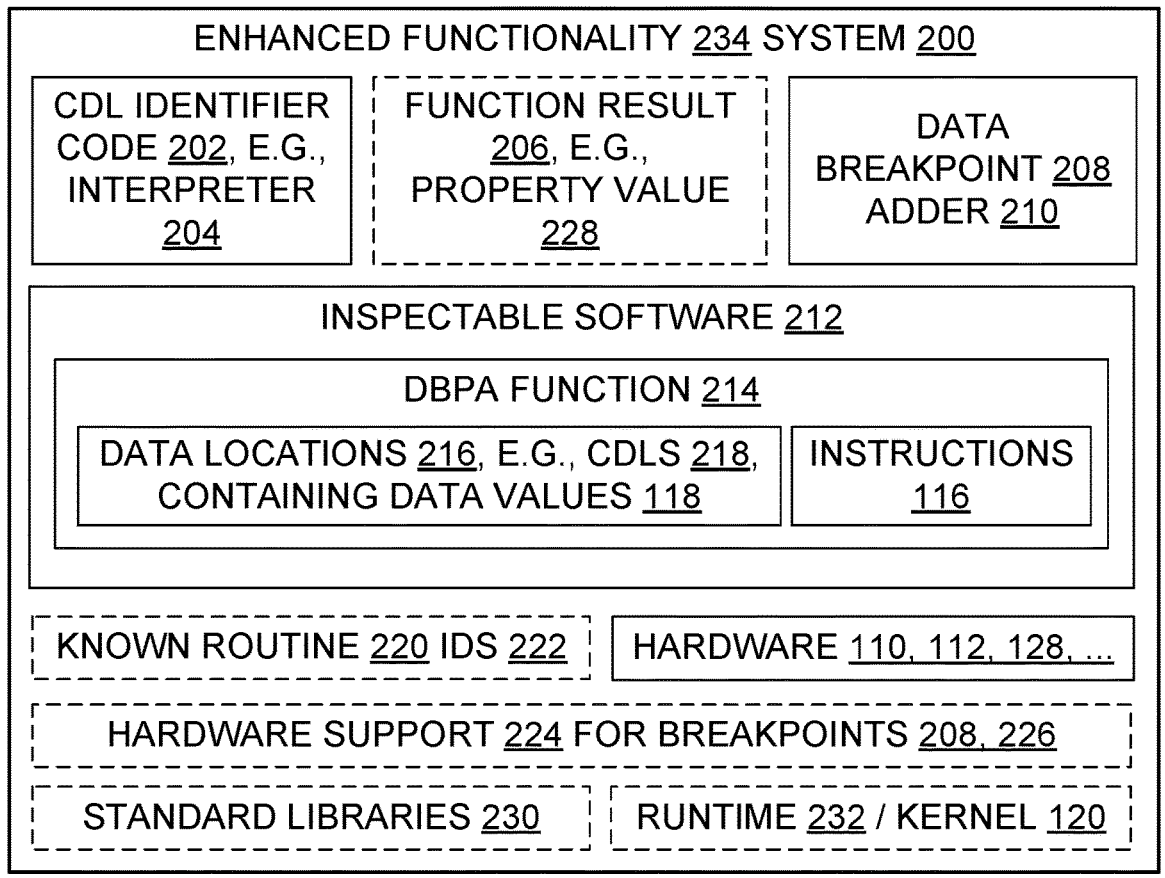
FIG. 2 is a block diagram illustrating aspects of an enhanced computing system which includes data breakpoint functionality.

FIG. 2 illustrates aspects of some software development or testing architectures that are suitable for some embodiments taught herein. An enhanced system 200 is system 102 enhanced by the addition of data breakpoint functionality as described herein. In particular, the illustrated enhanced system 200 includes an enhanced interpreter 204 or other CDL identifier code 202 which identifies CDLs 218 of DBPA functions 214. The illustrated enhanced system 200 also includes a data breakpoint adder 210, in the form of code which upon execution adds constituent breakpoints 208 on the CDLs. These data breakpoints on constituent data locations 218 of a function 214 collectively implement a data breakpoint 208 on the function itself, even when some CDLs of the function do not have their own respective breakpoints. The functions 214 of primary interest are a proper subset of functions generally, which are in turn a proper subset of routines generally. Data breakpoints 208 can be set to reveal the result 206 of a function, such as a property value 228, and the constituent values that went into the computation of that result 206. In some embodiments, data breakpoints 208 on functions are fully or partially implemented using hardware support 224. In some, storage locations 216 in standard libraries 230, in the runtime 232, or in the kernel 120, are excluded from being identified as CDLs 218.

Figure 3:
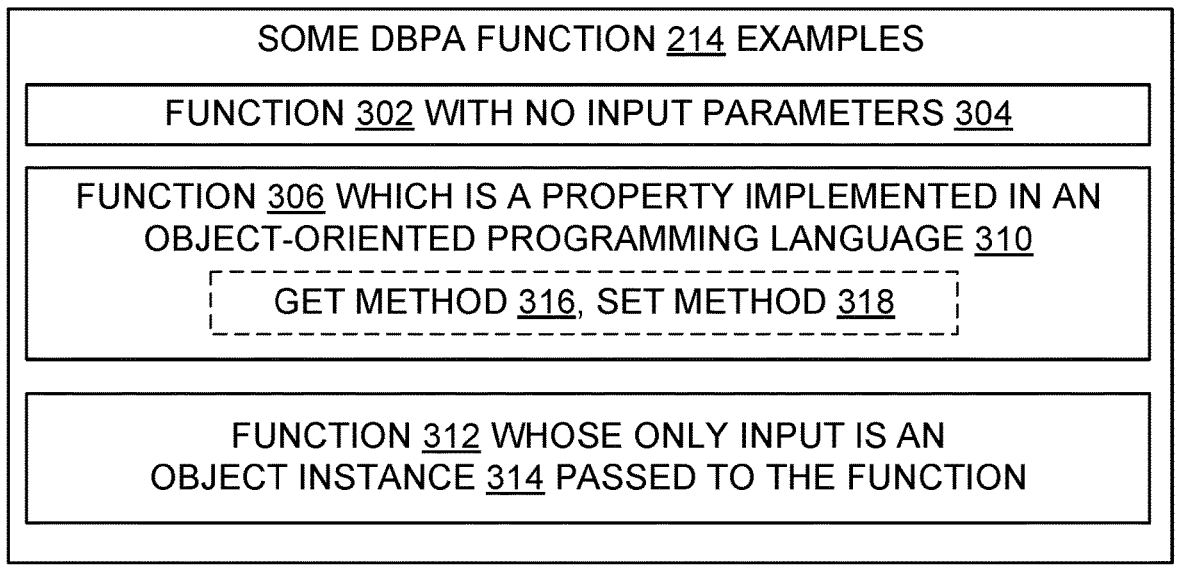
FIG. 3 is a block diagram illustrating some examples of functions that are amenable to having data breakpoints set.

As reflected in FIG. 3, object properties 306 are a motivating example of DBPA functions 214. Some other examples include functions 302 which have no input parameters, and functions 312 whose only input is an object instance 314. In an object-oriented programming language, object instance methods can be implemented by passing a hidden object instance to the method. The programmer doesn't normally see this hidden parameter explicitly; the compiler provides it during compilation. Properties 306 may be implemented to use such an object instance parameter. Suppose an object in a programming language has a 'Name' property. The programmer may write 'person.Name' to use this property in a program, where 'person' refers to an object instance. During compilation this gets translated to a call to a 'get_Name' function and at runtime a 'person' object is passed in that call. Similarly, some programming languages support the use of a '.this' construct which refers to a current object instance.

Figure 4:
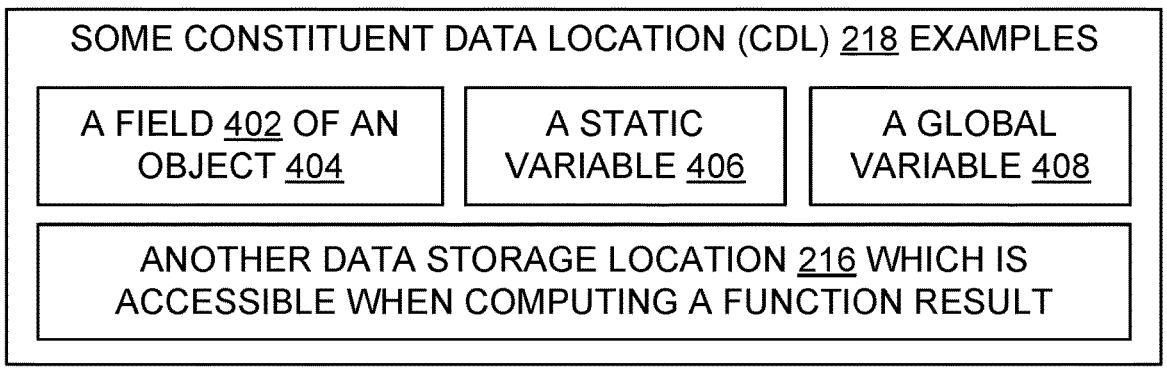
FIG. 4 is a block diagram illustrating some examples of data locations which are computational constituents of a function result.

FIG. 4 shows some examples of constituent data locations 218. Depending on the particular software 212, CDLs 218 may include a field 402 of an object 404, a static variable 406, a global variable 408, or another data storage location 216. To qualify as a CDL of a given function 214, however, the storage location 216 must be at least a potential constituent of the function's result.

Figure 5:
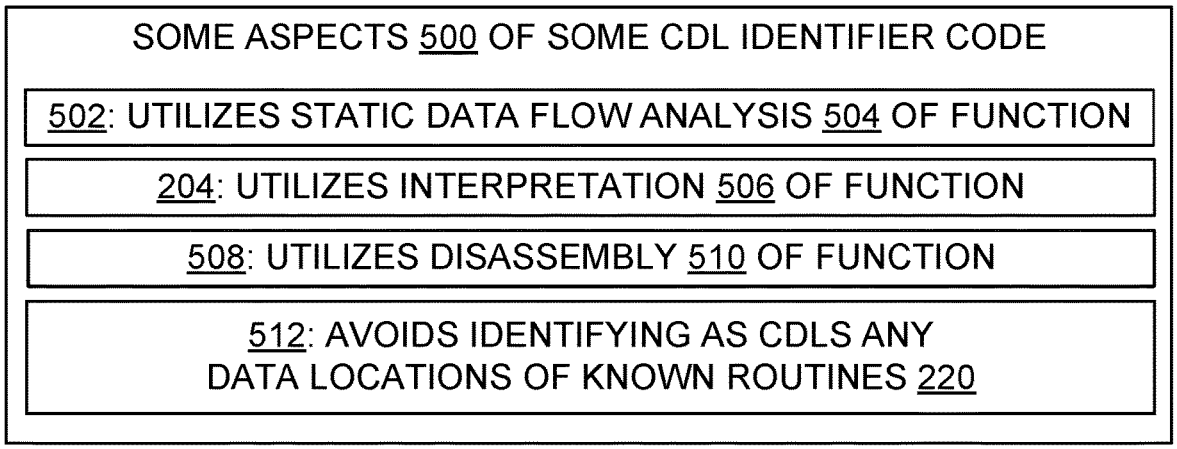
FIG. 5 is a block diagram illustrating some aspects of code that identifies constituent data locations.

FIG. 5 shows some aspects 500 of CDL identifier code 202. CDL identifier code 202 is code that identifies CDLs 218. How that CDL identification is accomplished for a given function—by static analysis or interpretation or both—depends on the particular embodiment, and may also depend on the function. IN some cases, CDL identifier code 202, 502 utilizes a static data flow analysis 504 to locate CDLs. In some cases, the CDL identifier code 202 includes an interpreter 204 which has been enhanced to note the identity of data locations which can contribute to a function's result value, that is, to note the identity of CDLs. In some cases, the CDL identifier code 202 disassembles 510 the function, and performs an analysis 504 on the disassembled code. In some cases, the CDL identifier code 202, 512 avoids analysis of known routines 220. These various characteristics 500 are not mutually exclusive; a given embodiment may include two or more of them.

Some embodiments provide or use a computing system 200 which is suitable for data breakpoint 208 usage, including a processor 110, a digital memory 112 in operable communication with the processor, an inspectable software 212, a CDL identifier code 202, and a data breakpoint adder 210. The inspectable software includes instructions 116 which are executable with the processor 110 and also includes data locations 216. The inspectable software also includes a function 214 which upon execution with the processor 110 computes a function result 206. The function result 206 is dependent upon one or more data values which are stored in respective constituent data locations (CDLs) 218 of the function in the computing system. The CDL identifier code 202 upon execution with the processor 110 identifies one or more CDLs 218 of the function 214. The data breakpoint adder 210 upon execution with the processor 110 adds a constituent data breakpoint 208 (which is configured to suspend execution of the inspectable software in response to entry of a data value 118) at a CDL 218 of the function. The CDL identifier code 202 and data breakpoint adder 210 contribute to data breakpoint functionality 234 in the computing system 200, which is configured to suspend execution of the inspectable software in response to occurrence of a CDL data entry as opposed to suspending execution in response to execution reaching a specified instruction of the inspectable software.

Different kinds of functions may have data breakpoints set. In some embodiments or situations, the function 214 has no input parameters. In some, the function 214 is a property 306 implemented in an object-oriented programming language 310, e.g., C #, JavaScript, Objective-C, Python, Lua, Visual Basic, or a similar language. In some embodiments or situations, the function 214 has only the object instance parameter passed to it; other input is not provided to the function.

In some embodiments or situations, the CDLs 218 of a function 214 include one or more of the following: a field 402 of an object 404, a static variable 406, a global variable 408, or a data value storage location 216 which is accessible to the processor for read or writes when computing the function result.

In some embodiments or situations, static data flow analysis 504 is utilized to identify the constituent data locations (CDLs) that a function's value can depend on. Hence, the CDL identifier code 202 includes code which performs, or invokes performance of, static data flow analysis.

In some embodiments or situations, disassembly 510 is utilized to identify the constituent data locations (CDLs) a function's value can depend on. Hence, the CDL identifier code 202 includes code which disassembles, or invokes disassembly of, at least a portion of the function.

In some embodiments or situations, interpretation 506 is utilized to identify the constituent data locations (CDLs) a function's value can depend on. Hence, the CDL identifier code 202 includes code which interprets, or invokes interpretation of, at least a portion of the function. Interpretation 506 has access to program 212 state information 924 (e.g., variable 216 values, processor 110 instruction pointer and other register values) which allows code 202 that uses interpretation to make a more accurate identification of CDLs than is feasible using static data flow analysis 504. For example, interpretation 506 gives code 202 access to functionality to resolve 710 the destination of virtual function calls 712 and to only search 916 conditional branches that will get executed based on the current state of the software 212.

In some embodiments or situations, the CDL identifier code 202 will hook known methods and stop the interpretation from seeking CDLs inside those known methods. "Known routines" are those defined as such in a given implementation, but it is expected they will generally include kernel 120 routines, runtime 232 routines, and standard library 230 routines. Hence, in some cases the system 200 includes a set of identifications 222 of known routines 220, and the CDL identifier code 202 is configured to avoid identifying data locations of the known routines as CDLs 218 of the function 214.

In some embodiments or situations, the efficiency of searching for CDLs can be enhanced by ignoring read-only locations 216. These may be present as locations marked by a 'readonly' keyword, or as private fields that are effectively read-only, for example, or may be found in other read-only situations. Hence, in some embodiments the CDL identifier code 202 is configured to avoid identifying, as CDLs of the function, data locations which are effectively read-only data locations.

In some embodiments or situations, the data breakpoint adder 210 is configured to employ at least one hardware breakpoint support capability 224 of the processor 110.

Other system embodiments are also described herein, either directly or derivable as system versions of described methods or configured media, informed by the extension discussion herein of computing hardware.

Methods

Technical methods shown in the Figures or otherwise disclosed will be performed automatically, e.g., by an enhanced debugger 122 which utilizes CDL identifier code 202 and a data breakpoint adder 210, unless otherwise indicated. Methods may also be performed in part automatically and in part manually to the extent action by a human administrator or other human person is implicated, e.g., by moving a cursor to a screen location near a property 306 and entering a command to set a data breakpoint 208 on the property. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 6, 8, and 9. Steps may be performed serially, in a partially overlapping manner, or fully in parallel. In particular, the order in which the flowchart 900 is traversed to indicate the steps performed during a method may vary from one performance of the method to another performance of the method. The flowchart traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments provide or use a process 900 for setting one or more data breakpoints in a computing system, with the process including receiving 602 a command 616 to set 614 a data breakpoint on a specified function in an inspectable software. The specified function 214 has instructions 116 which upon execution with a processor 110 compute 928 a function result that is dependent upon data stored in one or more constituent data locations (CDLs) of the function. The process also includes automatically identifying 604 at least two CDLs of the function, and adding 606 to the computing system a constituent data breakpoint 208 which is configured to suspend execution of the inspectable software in response to entry 612 of a data value at a CDL of the function. Thus, the process contributes 930 a data breakpoint functionality 234 to the computing system. The data breakpoint functionality is configured to suspend 608 execution of the inspectable software in response to occurrence of a CDL data entry 612 as opposed to suspending execution in response to execution reaching a specified instruction of the inspectable software.

In some embodiments, automatically identifying 604 at least one CDL of the function includes obtaining 918 CDL identifications 704 during an interpretation 506 of at least a portion of the specified function's instructions 116. One of skill may recognize some benefits of obtaining 918 data identification through interpretation, rather than relying solely on static data flow analysis 504. By using interpretation, one avoids shortcomings of static analysis that become evident as technical challenges such as how to resolve a virtual call, or how to perform adequate analysis of functions containing loops or other forms of conditional execution. In some embodiments, the interpretation 506 is further characterized in at least one of the following ways: the interpretation calls 706 a routine through a resolved virtual call 712, or the interpretation performs 714 instructions based on a condition 716 that is determined 718 during the interpretation.

Some embodiments and situations are specific to setting 614 a property 306 data breakpoint. Some also include actually suspending 608 execution based on the data breakpoint. Thus, in some embodiments the process automatically identifies 804, 604 at least one CDL 218 of a function 214 which is also a property 306, adds 606 a constituent data breakpoint which is configured to suspend execution in response to entry 612 of a data value at a CDL of the property 306, and further includes suspending 608 execution 610 based on the added data breakpoint.

In some embodiments, automatically identifying 604 at least one CDL of the function includes at least one of the following: performing 502 a static data flow analysis 504 to identify at least one of the CDLs, or recursing 902 on at least one routine which is configured to be directly or indirectly called in the function. In this context, a routine is called directly by a function when the routine call is in the body of the function, and a routine is called indirectly by a function when the routine call is separated from the body of the function by at least one intervening call.

In some embodiments, automatically identifying 604 at least one CDL of the function includes at least one of the following: excluding 906 as an identified CDL a private field data location 908, 216 which is effectively a read-only data location because it is not accessible to be part of the computation 928 of the function result, or excluding 910 as an identified CDL a data location which is designated in corresponding source code as a read-only data location 912.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as CDL identifier code 202, data breakpoint adder 210 code, or known routine identifiers 222, in the form of data 118 and instructions 116, read from a removable storage medium 114 and/or another source such as a network connection, to form a configured storage medium. The configured storage medium 112 is capable of causing a computer system to perform technical process steps for setting data breakpoints, as disclosed herein. The Figures thus help illustrate configured storage media embodiments and process embodiments, as well as system and process embodiments. In particular, any of the process steps illustrated in FIGS. 6 to 9, or otherwise taught herein, may be used to help configure a storage medium to form a configured storage medium embodiment.

Some embodiments provide or use a storage medium 114 configured with code which upon execution by one or more processors 110 performs a data breakpoint setting process 900, the process including receiving 602 a command 616 to set 614 a data breakpoint on a specified property in an inspectable software in a computing system, the specified property having instructions which upon execution with a processor compute a property value that is dependent upon data stored in one or more constituent data locations (CDLs) of the property; automatically identifying 804 at least one CDL of the property; and adding 606 to the computing system a constituent data breakpoint which is configured to suspend execution of the inspectable software in response to entry of a data value at a CDL of the property; whereby the process contributes 930 a data breakpoint functionality to the computing system, the data breakpoint functionality configured to suspend execution of the inspectable software in response to occurrence of a CDL data entry as opposed to suspending execution in response to execution reaching a get method 316 of the property or another specified instruction of the inspectable software.

In some embodiments, the process further includes setting a data breakpoint at least in part by employing 914 a hardware breakpoint support capability of the processor.

In some embodiments, the process further includes avoiding 512 identifying data locations of known routines as CDLs of the function.

In some embodiments, the process includes obtaining 918 CDL identifications during an interpretation 506 of at least a portion of the property's instructions.

Some embodiments ignore any code paths that might be used to compute the value of the property if the software 212 has a different state, but currently are not being used. That is, in some cases the process includes eliminating 920 from CDL identification one or more code paths 922 that could be used to compute the property value when the inspectable software has a state different than the current state but were not used to compute 928 the property value in a current state of the inspectable software.

Some Additional Examples and Considerations

Viewed at a high level, the process of setting 614 a data breakpoint on a property includes identifying 604 the constituent data locations such as fields, statics, and globals, and adding 606 constituent data breakpoints on at least some of those constituent data locations. One way to identify the constituent data locations involves disassembling 510 the property method and doing static data flow analysis 504. Another way to identify the constituent data locations involves interpreting 506 the property method and getting an identification of the constituent data locations from the interpreter 204.

Interpreting through the property can produce the value of the property, which is often of interest to a developer. Whenever any of the CDL variables is changed the property is re-interpreted to compute the new set of field values that are read since the value of the property the value of the property may have changed.

An enhanced interpreter 204 can grab the set of fields (for example) of current objects that were read in order to produce that property value, which allows the developer to monitor those fields or other CDLs using data breakpoints 208. Although a static analysis of the code 212 may identify 604 fields that can change the value of the property, an interpretation 506 approach has some technical advantages. Interpretation 506 avoids some difficult problems of static analysis such as deciding how to resolve a virtual call, or deciding how to deal with loops and other forms of conditional execution. Also, it can be easier to capture which fields were read by utilizing interpretation than by utilizing static analysis. Instead of having a static analyzer somehow produce a set of abstract CDLs that can be bound against live objects to produce actual CDLs, the CDL identifier code 202 can directly capture the right set of objects as the interpretation proceeds. Also, the CDL identifier code 202 in the form of an enhanced interpreter 204 can ignore any code paths that might in other executions be used to compute the value of the property, but in the current execution are not being used. This is particularly helpful when employing 914 hardware data breakpoints since there often are not many data breakpoints available.

Another enhancement of interpretation used in some embodiments is that rather perform a pure conventional interpretation over the intermediate language or native instructions, the embodiment instead will hook known methods and stop 512 the interpretation from pursuing CDL identification inside those known methods 220. When an embodiment has hooks for known methods it may avoid pursuing CDL identification inside those known methods, e.g., by avoiding interpretation to identify CDLs and avoiding static analysis to identify CDLs. This is beneficial because there are methods that exit the system being interpreted through, such as calls into the native part of the runtime 232 when interpreting over an intermediate language, or calls into the kernel 120 when interpreting native code. Avoiding CDL search in those methods helps avoid expending resources when developers are not permitted such access. Avoiding CDL search in known methods 220 may allow avoidance of access to fields in the underlying implementation of system primitives that shouldn't be tracked by the developer in question. In some cases and embodiments, CDL identifier code may encounter a native call or kernel call or the like that is not hooked (i.e., not identified as a known routine 220). In this situation, the embodiment may refuse a command to set a data breakpoint, and may return an error indicating that identification of constituent data locations is not feasible.

When employing 914 hardware breakpoints, it is beneficial to reduce the number of fields or other CDLs that are tracked because the hardware only supports a limited number of breakpoints (e.g., only four). Some embodiments determine if a given field or other potential CDL is actually ever written to and ignore 906, 910 any data locations which are read only. Avoidance may be accomplished via examination of methods that could potentially write to the field to determine if they actually do not. In languages that support it, avoidance may be accomplished by recognizing that a field is declared a field as 'read only' and so can be ignored 910. For example, an embodiment may recognize use of the 'readonly' keyword in the C # ("C-sharp") programming language.

Some embodiments use or provide a process including receiving 602 a command 616 to set 614 a data breakpoint on a specified item 214 in a software program, the specified item having associated executable code which is configured to upon execution with a processor compute at least one value 206 for the specified item; disassembling 510 at least a portion of the executable code that is associated with the specified item; performing a data flow analysis 504 using a result of the disassembling, thereby identifying 604 one or more constituent data locations (CDLs) whose respective values are utilizable during execution of the associated executable code to compute at least one value for the specified item; and adding 606 a data breakpoint on each CDL.

In some embodiments, the process further includes recursing 902 on at least one routine 708 which is configured to be called in the associated executable code, the recursing including disassembling at least a portion of the at least one routine and performing a data flow analysis using a result of the disassembling of at least a portion of the at least one routine.

In some embodiments, the specified item 214 is a property 306, and the associated executable code includes code which is configured to upon execution with the processor compute at least one value 206, 228 for the property. In some of these embodiments, the specified item is a property having a get method 316, and the associated executable code includes get method code which is configured to upon execution with a processor compute at least one value for the property.

In some embodiments, the disassembling 510 produces at least one of the following: native code instructions 116 which correspond to the executable code, or intermediate language instructions 116 which correspond to the executable code.

In some embodiments, adding 606 the data breakpoint on a particular CDL includes configuring the data breakpoint to employ 914 hardware breakpoint support in the processor to stop software execution when data content of the particular CDL changes. In some cases, an embodiments also or instead uses code location breakpoints in an effort to emulate data breakpoints on fields as opposed to relying 914 on the rapid breakpoint recognition hardware of the system.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

Conclusion

In short, teachings are provided herein to set 614 data breakpoints on properties 306 and certain other functions 214. In particular, constituent data locations (CDLs) 218 that can contribute to computation 928 of the property value 228 or other function result 206 are identified 604, and respective constituent data breakpoints 208 are added 606 at one or more CDLs by data breakpoint adder code 210. Each constituent data breakpoint will suspend 608 execution 610 of an inspectable software 212 in response to occurrence of a CDL data entry 612. The CDLs are identified 604 by CDL identifier code 202 using a combination of one or more of static data flow analysis 504, enhanced interpretation 506, or disassembly 510, with recursion 902 as appropriate to extend the CDL search 916. Kernel 120 or runtime 232 routines, and other routines designated as known routines 220, can be excluded 512 from the CDL search 916. Data locations 216 marked read-only, or that are effectively read-only because they will not be written, can also be excluded 906, 910. The resulting data breakpoint functionality 234 makes more internal program state information 924 available, thus facilitating computing system 200 accuracy, flexibility, security, speed, memory usage efficiency, and other functional characteristics.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 5 to 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system suitable for data breakpoint usage, the computing system comprising:
   a processor;
   a digital memory in operable communication with the processor;
   an inspectable software including instructions which are executable with the processor and also including data locations, the inspectable software including a function which upon execution with the processor computes a function result, the function result dependent upon one or more data values which are stored in respective constituent data locations (CDLs) of the function in the computing system;
   a CDL identifier code which upon execution with the processor identifies one or more CDLs of the function; and
   a data breakpoint adder which upon execution with the processor adds a constituent data breakpoint which is configured to suspend execution of the inspectable software in response to entry of a data value at a CDL of the function;
   whereby the CDL identifier code and data breakpoint adder contribute to data breakpoint functionality in the computing system, the data breakpoint functionality configured to suspend execution of the inspectable software in response to occurrence of a CDL data entry as opposed to suspending execution in response to execution reaching a specified instruction of the inspectable software.

2. The computing system of claim 1, wherein the computing system is further characterized in at least one of the following ways:
   the function has no input parameters;
   the function is a property implemented in an object-oriented programming language; or
   the function's only input parameter is an object instance.

3. The computing system of claim 1, wherein the CDLs comprise one or more of the following: a field of an object, a static variable, a global variable, or a data value storage location which is accessible when computing the function result.

4. The computing system of claim 1, wherein the CDL identifier code comprises code which performs, or invokes performance of, static data flow analysis.

5. The computing system of claim 1, wherein the CDL identifier code comprises code which disassembles, or invokes disassembly of, at least a portion of the function.

6. The computing system of claim 1, wherein the CDL identifier code comprises code which interprets, or invokes interpretation of, at least a portion of the function.

7. The computing system of claim 1, further comprising a set of identifications of known routines, and wherein the CDL identifier code is configured to avoid identifying data locations of the known routines as CDLs of the function.

8. The computing system of claim 1, wherein the CDL identifier code is configured to avoid identifying, as CDLs of the function, data locations which are effectively read-only data locations.

9. The computing system of claim 1, wherein the data breakpoint adder is configured to employ at least one hardware breakpoint support capability of the processor.

10. A process for setting a data breakpoint in a computing system, the process comprising:
receiving a command to set a data breakpoint on a specified function in an inspectable software, the specified function having instructions which upon execution with a processor compute a function result that is dependent upon data stored in one or more constituent data locations (CDLs) of the function;
automatically identifying at least two CDLs of the function; and
adding to the computing system constituent data breakpoints corresponding to respective CDLs, each constituent data breakpoint configured to suspend execution of the inspectable software in response to entry of a data value at a CDL of the function;
whereby the process contributes a data breakpoint functionality to the computing system, the data breakpoint functionality configured to suspend execution of the inspectable software in response to occurrence of a CDL data entry as opposed to suspending execution in response to execution reaching a specified instruction of the inspectable software.

11. The process of claim 10, wherein automatically identifying at least one CDL of the function comprises obtaining CDL identifications during an interpretation of at least a portion of the specified function's instructions.

12. The process of claim 11, wherein the interpretation is further characterized in at least one of the following ways:
the interpretation calls a routine through a resolved virtual call; or
the interpretation performs instructions based on a condition that is determined during the interpretation.

13. The process of claim 10, wherein the process automatically identifies at least one CDL of a function which is also a property, adds a constituent data breakpoint which is configured to suspend execution in response to entry of a data value at a CDL of the property, and further comprises suspending execution based on the added constituent data breakpoint.

14. The process of claim 10, wherein automatically identifying at least one CDL of the function comprises at least one of the following:
performing a static data flow analysis to identify at least one of the CDLs;
recursing on at least one routine which is configured to be directly or indirectly called in the function.

15. The process of claim 10, wherein automatically identifying at least one CDL of the function comprises at least one of the following:
excluding as an identified CDL a private field data location which is effectively a read-only data location; or
excluding as an identified CDL a data location which is designated in corresponding source code as a read-only data location.

16. A storage medium configured with code which upon execution by one or more processors performs a data breakpoint setting process, the process comprising:
receiving a command to set a data breakpoint on a specified property in an inspectable software in a computing system, the specified property having instructions which upon execution with a processor compute a property value that is dependent upon data stored in one or more constituent data locations (CDLs) of the property;
automatically identifying at least one CDL of the property; and
adding to the computing system a constituent data breakpoint which is configured to suspend execution of the inspectable software in response to entry of a data value at a CDL of the property;
whereby the process contributes a data breakpoint functionality to the computing system, the data breakpoint functionality configured to suspend execution of the inspectable software in response to occurrence of a CDL data entry as opposed to suspending execution in response to execution reaching a get method of the property or another specified instruction of the inspectable software.

17. The storage medium of claim 16, wherein the process further comprises setting a data breakpoint at least in part by employing a hardware breakpoint support capability of the processor.

18. The storage medium of claim 16, wherein the process further comprises at least one of the following: avoiding identifying data locations of known routines as CDLs of the function; adjusting a breakpoint to match a new location of a CDL after the CDL is moved in memory.

19. The storage medium of claim 16, wherein the process comprises obtaining CDL identifications during an interpretation of at least a portion of the property's instructions.

20. The storage medium of claim 16, wherein the process comprises eliminating from CDL identification one or more code paths that could be used to compute the property value when the inspectable software has a state different than the current state but were not used to compute the property value in a current state of the inspectable software.

* * * * *